United States Patent
Siessl et al.

(10) Patent No.: US 10,208,803 B2
(45) Date of Patent: Feb. 19, 2019

(54) BEARING ARRANGEMENT

(71) Applicant: Miba Sinter Austria GmbH, Laakirchen (AT)

(72) Inventors: Wolfgang Siessl, Traunkirchen (AT); Karl Dickinger, Vorchdorf (AT)

(73) Assignee: Miba Sinter Austria GmbH, Laakirchen (AT)

( * ) Notice: Subject to any disclaimer, the term of this patent is extended or adjusted under 35 U.S.C. 154(b) by 0 days.

(21) Appl. No.: 15/608,009

(22) Filed: May 30, 2017

(65) Prior Publication Data

US 2017/0350451 A1  Dec. 7, 2017

(30) Foreign Application Priority Data

Jun. 3, 2016  (AT) .............. A 50510/2016

(51) Int. Cl.
| | |
|---|---|
| *F16C 9/02* | (2006.01) |
| *F16C 35/02* | (2006.01) |
| *F16C 43/02* | (2006.01) |
| *F16C 9/03* | (2006.01) |
| *F16C 9/04* | (2006.01) |

(52) U.S. Cl.
CPC .............. *F16C 35/02* (2013.01); *F16C 9/02* (2013.01); *F16C 9/03* (2013.01); *F16C 9/04* (2013.01); *F16C 43/02* (2013.01); *F16C 2226/76* (2013.01)

(58) Field of Classification Search
CPC .. F16C 35/02; F16C 17/02; F16C 9/02; F16C 2360/18; F16C 2360/22; F16C 2226/70; F16C 2226/76; F16C 2226/80; F16C 9/03; F16C 9/04; F16C 43/02
See application file for complete search history.

(56) References Cited

U.S. PATENT DOCUMENTS

| | | | | |
|---|---|---|---|---|
| 805,996 | A | * 11/1905 | Pontious | A01C 5/068 384/401 |
| 1,155,539 | A | * 10/1915 | Baker | F16C 35/02 384/434 |
| 1,453,518 | A | * 5/1923 | Price | F16C 9/02 384/432 |
| 3,353,832 | A | * 11/1967 | Coulson | F16C 9/02 277/591 |
| 3,782,792 | A | * 1/1974 | Pfleiderer | F16C 9/02 384/432 |
| 4,189,193 | A | * 2/1980 | Schumacher | F16C 9/02 123/195 H |

(Continued)

FOREIGN PATENT DOCUMENTS

| | | |
|---|---|---|
| AT | 507 265 A1 | 3/2010 |
| AT | 517 169 A1 | 11/2016 |

(Continued)

*Primary Examiner* — Alan B Waits
(74) *Attorney, Agent, or Firm* — Collard & Roe, P.C.

(57) ABSTRACT

The invention relates to a bearing arrangement (1) comprising a bearing cover (3) and a bearing block (2) fitting onto the latter, which bearing block in the area of the bearing cover (3) comprises a recess (9) in which the bearing cover (3) can be arranged and which comprises vertical deformation elements (15) with a longitudinal extension (19), wherein the vertical deformation elements (15) have a greater degree of plastic deformability than the bearing block (2).

8 Claims, 2 Drawing Sheets

(56) References Cited

U.S. PATENT DOCUMENTS

| | | | | |
|---|---|---|---|---|
| 5,299,871 | A * | 4/1994 | Hancock | F02F 7/0053 123/195 R |
| 6,027,784 | A * | 2/2000 | Taguchi | F16C 7/023 123/90.61 |
| 6,086,258 | A | 7/2000 | Cadle et al. | |
| 6,422,755 | B1 * | 7/2002 | Cadle | B22F 5/00 29/888.092 |
| 6,435,723 | B1 * | 8/2002 | Wolf | B23H 9/00 29/898 |
| 6,471,406 | B1 * | 10/2002 | Cadle | B22F 5/00 384/433 |
| 6,626,576 | B1 * | 9/2003 | Cadle | B22F 5/00 384/273 |
| 6,742,259 | B2 * | 6/2004 | Thompson | F16C 35/02 29/898.09 |
| 8,690,439 | B2 * | 4/2014 | Dickinger | F16C 9/02 384/432 |
| 9,689,432 | B2 * | 6/2017 | Karlsberger | F16C 35/02 |
| 2011/0012420 | A1 * | 1/2011 | Nakagawa | B60B 27/0005 301/110 |
| 2011/0158569 | A1 * | 6/2011 | Dickinger | F16C 9/02 384/434 |
| 2012/0291746 | A1 * | 11/2012 | Breidenbach | F02F 7/0053 123/195 R |
| 2013/0004103 | A1 * | 1/2013 | Shaffer | F16C 9/02 384/276 |
| 2014/0361606 | A1 * | 12/2014 | Mochinaga | B60B 27/0026 301/109 |
| 2016/0319874 | A1 | 11/2016 | Karlsberger et al. | |
| 2017/0314507 | A1 * | 11/2017 | Ikehara | F02F 7/0053 |

FOREIGN PATENT DOCUMENTS

| | | |
|---|---|---|
| DE | 1 962 325 A1 | 6/1971 |
| EP | 2 574 743 A1 | 4/2013 |
| JP | 2001-050108 A | 2/2001 |
| JP | 2003-041302 A | 2/2003 |
| JP | 2007-333170 A | 12/2007 |

* cited by examiner

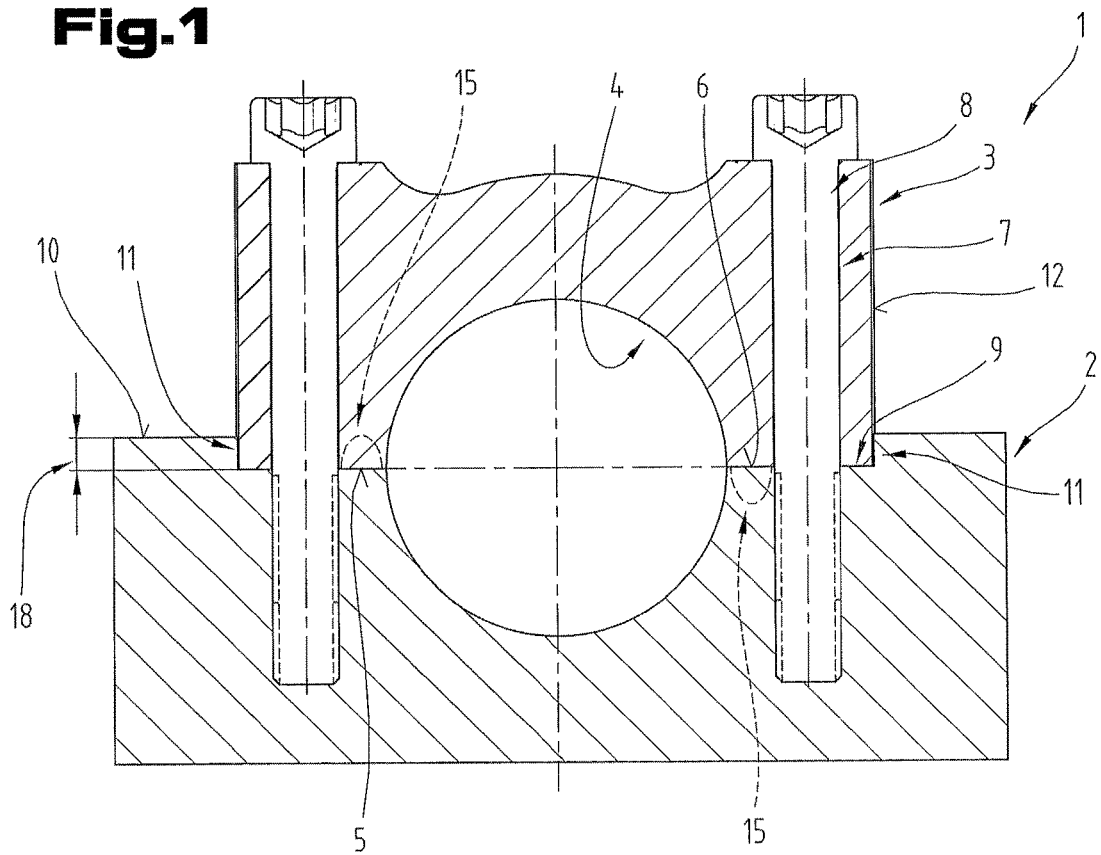
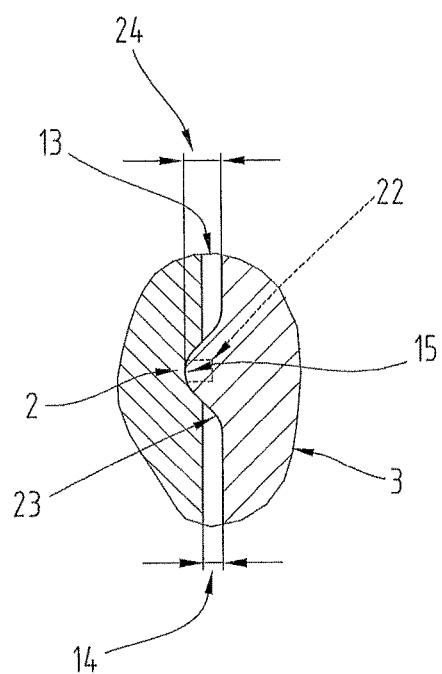
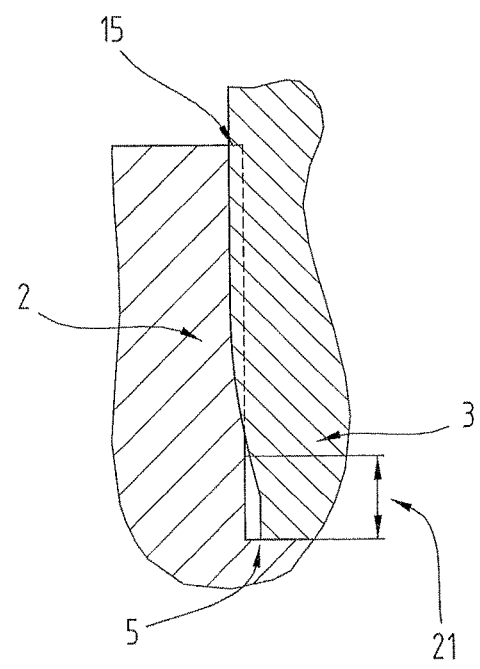

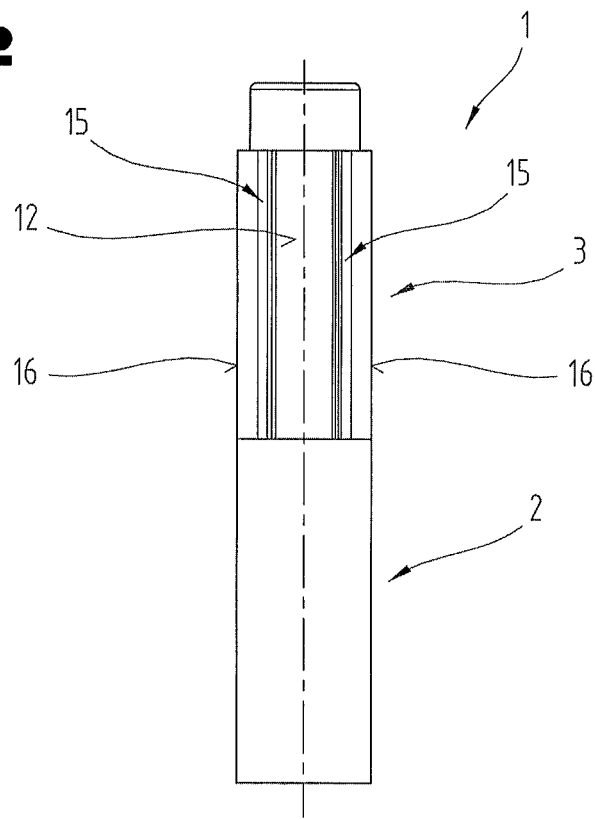
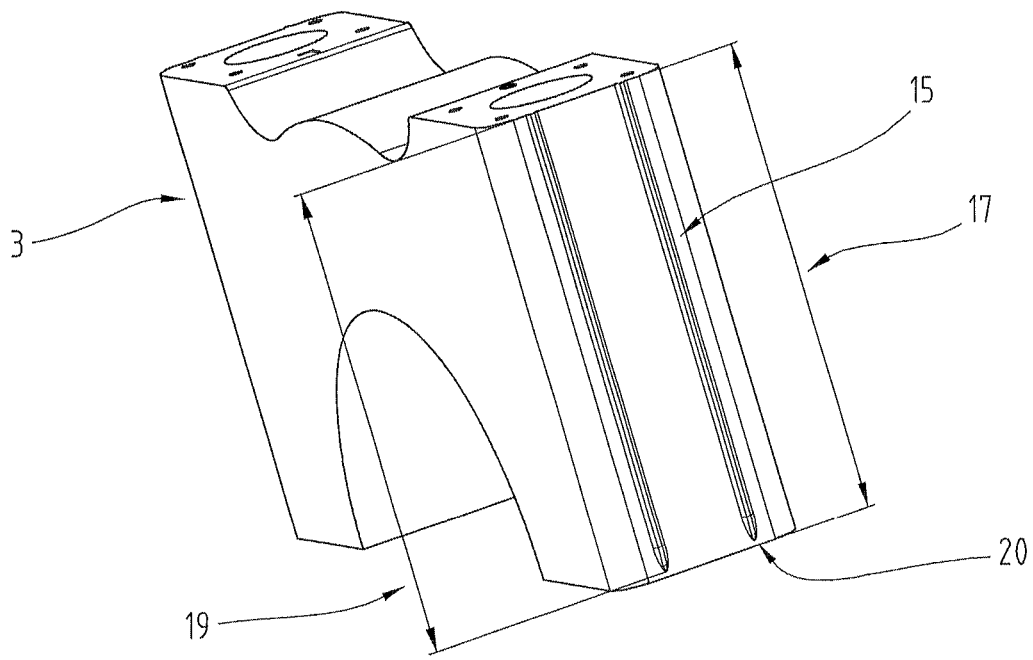

BEARING ARRANGEMENT

CROSS REFERENCE TO RELATED APPLICATIONS

Applicant claims priority under 35 U.S.C. § 119 of Austrian Application No. A 50510/2016 filed on Jun. 3, 2016, the disclosure of which is incorporated by reference.

The invention relates to a bearing arrangement comprising a bearing cover and a bearing block fitting thereon.

Divided bearing arrangements, for example for connecting rods or crankshafts, are known from the prior art. The latter usually consist of a bearing block and a bearing cover, wherein between the latter a bearing is formed for a shaft. To form the bearing point it is essential that the bearing cover fits exactly on the bearing block. The exact fit not only needs to be maintained during the operation of the bearing, but needs to be able to be reproduced after possible disassembly of the bearing cover, where the bearing cover needs to be in exactly the same position on the bearing block as before the disassembly.

To achieve this the bearing block and bearing cover are often made in one piece and then split by fracturing afterwards. A different solution which is widely available for positioning the bearing cover consists of centering by means of slightly overlapping the bearing cover over the bearing cover length in connection with an accurately produced bearing track on the bearing block. This solution requires an accurately produced bearing track but also a close tolerance bearing cover length to avoid too much overlap, so that in this way the tension induced is not too high when the bearing cover is clamped into the bearing block. It is only possible to achieve the required bearing cover tolerances by means of mechanical reworking or by calibrating the bearing cover.

The objective of the present invention is to create a divided bearing arrangement in which the effect of tolerances on the induction of tension can be reduced.

The objective of the invention is achieved in the aforementioned bearing arrangement in that the bearing block has a recess in the area of the arrangement of the bearing cover, in which recess the bearing cover can be arranged, and in that the bearing cover comprises vertically running deformation elements with a longitudinal extension, wherein said vertically running deformation elements have a greater degree of plastic deformability than the bearing block.

It is an advantage here that during the clamping of the bearing cover on the bearing block the deformation elements can be deformed plastically by the latter. In this way the slight overlapping of the bearing cover relative to the bearing block is no longer necessary, whereby the effect of the manufacturing tolerances of the bearing cover on the tension indication can be reduced. In this way the production of the bearing arrangement can be simplified, as it is no longer necessary to perform a machine reworking or calibration of the bearing cover. By reducing the number of processing steps the production costs of the bearing arrangement can be lowered.

According to one embodiment variant of the bearing arrangement the deformation elements can be formed by webs and/or grooves. In this way the assembly of the bearing arrangement can be simplified, as by means of said deformation elements the bearing cover can be guided more simply during the clamping.

It is also possible that the recess of the bearing block for the arrangement of the bearing cover is delimited by side walls, wherein said side walls have further deformation elements which have a smaller cross-section than the deformation elements of the bearing cover, as viewed in the same direction. In this way on the one hand it is possible to achieve better clamping of the bearing cover with the bearing block. On the other hand said deformation elements can also be designed to be opposite the deformation elements on the bearing cover, whereby the insertion of the deformation elements on the bearing cover into the opposite surface on the bearing block can be simplified, in particular the extent of the displacement of material by the deformation elements on the bearing cover can be reduced.

To improve the insertion of the deformation elements on the bearing cover into the counter surface on the bearing block it is possible that the deformation elements of the bearing cover are designed to taper over the longitudinal extension at least partly or are provided with bevelling. In particular, it is an advantage if the first portion of the deformation elements on the bearing cover, i.e. the area which comes first into contact with the counter surface on the bearing block, is tapered or provided with bevelling, whereby the displacement of material in the counter surface on the bearing block at the beginning of the clamping of the bearing cover to the bearing block can be simplified.

For the same reasons it is also possible that the deformation elements of the bearing cover as viewed in direction of the longitudinal extension have an at least approximately triangular or trapezoidal cross-section.

To improve the absorption of transverse forces at least two deformation elements can be arranged for each vertical bearing surface of the bearing cover, by which the bearing cover fits on the bearing block.

Preferably, the deformation elements of the bearing block are designed to be at least approximately complementary to the deformation elements of the bearing cover. In this way the plastic deformation of the deformation elements of the bearing cover can be simplified.

It is possible to achieve an improvement of the clamping of the bearing cover to the bearing block if at least one positioning element is arranged on the horizontal flat surfaces, on which the bearing cover and the bearing block fit on another.

For a better understanding of the invention the latter is explained in more detail with reference to the following figures.

In a much simplified, schematic view:

FIG. 1 shows a cross-section of a bearing arrangement;

FIG. 2 shows a side view of the bearing arrangement;

FIG. 3 shows a detail of the bearing arrangement in the area of the deformation elements in cross-section;

FIG. 4 shows a perspective view of the bearing cover;

FIG. 5 shows a detail of a bearing arrangement in the area of the deformation element in cross-section.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIGS. 1 to 4 show a divided bearing arrangement 1, as used for example in a machine housing of a piston machine or a connecting rod. Said bearing arrangement 1 comprises a bearing block 2 and a bearing cover 3, which together form a sliding bearing 4, for example for a crankshaft. The bearing cover 3 comprises at both distal ends respectively a clamping surface 5 and the bearing block 2 comprises at both its ends respectively counter clamping surfaces 6 opposite the clamping surfaces 5. For clamping the bearing block 2 to the bearing cover 3 a continuous bore 7 is provided respectively in the distal end sections. In said bore 7 a bolt 8 is received. The bolt 8 engages in a thread of a blind bore in the bearing block 2, whereby the clamped can be achieved. Alternatively, the bore can be designed to be continuous in the bearing block 2 and possibly without an internal thread. In this case the clamping can be achieved by means of a corresponding nut attached underneath the bearing block 2 on the bolt 8.

The bearing block 2 has a recess 9 in which the bearing cover 3 is mounted. In this way the counter clamping surface 6 of the bearing block 2 is arranged to be stepped relative to an outer surface 10. The recess 9 is delimited at the side by side walls 11. The counter clamping surface 6 forms the lower closure in the area of the bearing cover 3.

In the shown embodiment variant of the bearing arrangement 1 the recess 9 has a rectangular cross-section in axial direction (direction perpendicular to the plane of the paper) (without considering the recess adjoining the recess 9 at the bottom which forms part of the sliding bearing or for sliding bearing 4). This cross-section should not be considered to be restrictive however. Rather this cross-section corresponds with the form of the bearing cover 3—as viewed in the same direction—in the area of the recess 9.

By matching the cross-section of the recess 9 to the form of the bearing cover 3 the latter fits with at least approximately, in particular precisely, vertical bearing cover side walls 12 on the side walls 11 of the bearing block 2 or fits at least approximately, so that a narrow gap 13 can be formed between the cover side walls 12 and the side walls 11, as shown in FIG. 3. The width 14 of the gap 13 can be selected from a range of 5 μm to 1000 μm.

As shown in FIG. 2, on each of the two vertical bearing cover side walls 12 at least one deformation element 15 is arranged or formed, by means of which the bearing cover 3 can be positioned on or in the bearing block 2.

It should be noted that the two bearing cover side walls 12 do not necessarily need to be vertical (although this is the preferred embodiment variant), but for example could also be oblique at an angle to the horizontal, so that the bearing cover 3 thus tapers in the direction of the bearing block 2.

In the shown, preferred embodiment variant of the bearing cover 3 for each bearing cover side wall 12 two such deformation elements 15 are arranged or formed. However, it is also possible to have fewer or more than two such deformation elements 15, for example three, four, five, etc.

The two deformation elements 15 per bearing cover side wall 12 are arranged or formed in particular spaced apart from the axial end faces 16 of the bearing cover 2 and off-centre at a distance from one another, as shown in FIG. 2.

In the preferred embodiment variant of the bearing cover 3 the deformation elements 15 are designed as webs projecting over the bearing cover side walls 12, as shown in FIG. 3 and FIG. 4. However, the deformation elements 15 can also have a different form, for example they can be designed as grooves which are formed as depressions in the bearing cover side walls 12.

It is also possible that on the bearing cover side wall or walls 12 differently designed deformation elements 15 are arranged or formed, for example both webs and grooves.

The deformation elements 15 can extend from the plane of the clamping surfaces 5 over the whole bearing cover side wall height 17. However, it also possible that the deformation elements 15 only extend over a portion of said bearing cover side wall height 17, however, in any case the arrangement should be such that the deformation elements 15 also extend at least over a portion of a side wall height 18 of the side walls 11 of the bearing block 2.

The vertically running deformation elements 15 have a greater degree of plastic deformability than the bearing block 2. This can be achieved in that the deformation elements 15 are made from a softer material than the bearing block 2 and/or that the deformation elements 15 have cavities, for example pores, which are pushed together at least partly during the plastic deformation. In the latter case the deformation elements 15 can be made in particular from a sintered material.

However, it is also possible that the whole bearing cover 3 is made from a material from which the deformation elements 15 are also made.

In particular, the deformation elements 15 and the bearing covers 3 are made from a metal material, for example aluminium or an aluminium alloy or a magnesium alloy. The bearing block 2 is also made in particular from a metal or a metal alloy, for example cast iron.

By clamping together the bearing cover 3 and the bearing block 2 by means of the bolts 8 the deformation elements 15 are plastically deformed by the side walls 11 of the bearing block 2 by the displacement of material, whereby the positioning of the bearing cover 3 and the repositioning of the bearing cover 2 can be achieved after its disassembly, for example to repair the sliding bearing 4, so that the bearing cover 3 on reassembly readopts the correct position relative to the bearing block 2. By means of plastic deformation less tension is created in the material of the bearing cover 3 in the region of the deformation elements 15.

The deformation elements 15 can have a uniform cross-section over the whole longitudinal extension 19. However, according to a further embodiment variant of the bearing arrangement 1 it is also possible that the deformation elements 15 of the bearing block 2 are designed to taper at least partly over the longitudinal extension 19, as shown in FIG. 4, or are provided with bevelling. In particular, a lower area 20 of the deformation elements pointing in the direction of the clamping surface 5 is designed to be tapering or provided with bevelling, for example pointed. Thus in this way the penetration of the deformation elements 15 into possibly provided grooves in the side walls 11 of the bearing block 2 can be simplified when clamping together with the bearing cover 3.

To achieve better plastic deformability the deformation elements 15 of the bearing cover 3 can also have a conically tapering shape at least over an area of 20% to 100% of their longitudinal extension 19, so that they become wider in particular from the bottom end, which in the assembled state of the bearing arrangement 1 faces the counter clamping surface 6 of the bearing block 2.

It is also possible to arrange the deformation elements 15 firstly at a distance 21 from the plane of the clamping surfaces 5, as shown in FIG. 5. In this way the insertion of the bearing cover 3 into the recess 9 of the bearing block 2 can be simplified. The distance 21 can be selected from a range of 0.5 mm to 15 mm.

To achieve better plastic deformation and if possible for simpler insertion into the grooves the side surfaces 11 of the bearing block 2 the deformation elements 15 can have an at least approximately triangular cross-section—as viewed in the direction of their longitudinal extension 19, so that the latter are thus designed in the form of blades. The term "at least approximately" means that the deformation elements 15 can also be provided partly with a rounding. In particular the tip of the triangle can be rounded, as shown in FIG. 3. In other words, the deformation elements 15 can also have a wave-like cross-section.

Other cross-sectional forms for the deformation elements 15 can also be used, for example diamond-shaped or generally polygonal cross-sections, wherein rounded or curved or trapezoidal cross-sectional forms are preferred.

It is also possible for the deformation elements 15 to have a recess 22, for example a longitudinal groove in the area facing the side wall 11 of the bearing block 2 (as shown by dashed lines in FIG. 3) and/or in at least one side flank 23, whereby the plastic deformability of the deformation elements 15 can also be improved.

Preferably, the longitudinal extension 19 of the deformation elements 15 is greater than the height 24. The height 24 is thereby the overlap of the deformation elements 15 over the bearing cover side wall 12. The height 24 of the deformation elements 15 can be selected from a range of 5 µm to 3 mm.

According to an additional embodiment variant of the bearing arrangement 1 it is possible that—as already explained above—further deformation elements 15 are arranged on the bearing cover side walls 12 of the bearing cover 3 and on the side walls 11 of the bearing block opposite the bearing cover side walls 12. Said additional deformation elements 15 can be designed to be complementary to the deformation elements 15 of the bearing cover 3, i.e. having a cross-sectional form which is inverse to that of the deformation elements 15 of the bearing cover 3. In this way the deformation elements 15 of the bearing cover 3 can cooperate with the additional deformation elements 15 of the bearing block 2. For example the deformation elements 15 of the bearing cover 3 can be designed as webs and the additional deformation elements 15 of the bearing block 2 can be designed as grooves, wherein the webs of the bearing cover 3 engage in the grooves of the bearing block 2. In this case the additional deformation elements 15 of the bearing block 2 are designed to be smaller in particular with respect to their cross-section than the deformation elements 15 of the bearing cover 3 (as viewed respectively in the same direction), so that in this embodiment variant the deformation elements 15 of the bearing cover 3 are also plastically deformed.

It should be mentioned in this connection that in FIG. 3 the aforementioned embodiment variant is shown with the additional deformation elements 15 in the form of grooves. In the simplest embodiment variant however the side walls 11 are designed without any deformation elements 15, i.e. as a planar surface without separate depressions or elevations.

Furthermore, it should be mentioned that the deformation elements 15 of the bearing block 2, if provided, cause a deformation of the deformation elements 15 of the bearing cover 3 or generally a partial plastic deformation of the bearing cover 3. The (additional) deformation elements 15 are not plastically deformed themselves, as the bearing block 2—as already mentioned—is made at least partly from a material which has a lower degree of plastic deformability than the guiding element 15 of the bearing cover 3.

In principle, also the reverse version of this embodiment is possible, such that for example the grooves are formed on the bearing cover 3 and the webs are formed on the bearing block 2, and have the corresponding size ratio of the cross-sectional geometry.

The cross-sectional area of the additional deformation elements 15 of the bearing block 2 can be smaller by a value than the cross-sectional area of the deformation elements 15 of the bearing cover 3 which is selected from a range of 10% to 40%, in particular 15% to 25%, relative to the respectively larger cross-sectional area (as viewed in the same direction respectively).

According to another embodiment variant of the bearing arrangement 1 it is also possible that not only the deformation elements 15 are formed or arranged on the bearing cover 3 and possibly the additional deformation elements 15 are formed or arranged on the bearing block 2, but also additional positioning elements are arranged on the clamping surface 5 of the bearing cover 3 and/or on the counter clamping surface 6 of the bearing block 2, as is known. Said additional positioning elements can be designed in particular according to the projections described in AT 507 265 A1. Therefore, with regard to said projections reference is made in particular to the disclosure of AT 507 265 A1, which in this connection forms a component of the present description. For example, the additional positioning elements can be designed as discrete projections or positioning webs etc.

The bearing block 2 and/or the bearing cover 3 can be in the form of sintered components made from a sintered material.

The example embodiments show possible embodiment variants of the bearing arrangement 1, wherein it should be noted at this point that various different combinations of the individual embodiment variants are also possible.

Finally, as a point of formality it should be noted that for a better understanding of the structure of the bearing arrangement 1 the latter and its components have not been represented true to scale in part and/or have been enlarged and/or reduced in size.

LIST OF REFERENCE NUMERALS 1 bearing arrangement
2 bearing block
3 bearing cover
4 sliding bearing
5 clamping surface
6 counter clamping surface
7 bore
8 bolt
9 recess
10 outer surface
11 side wall
12 bearing cover side wall
13 gap
14 gap width
15 deformation element
16 end face
17 bearing cover side wall height
18 side wall height
19 longitudinal extension
20 area
21 distance
22 recess
23 side flank
24 height

The invention claimed is:

1. A bearing arrangement comprising
a bearing block; and
a bearing cover mounted in the bearing block;
wherein the bearing cover comprises clamping surfaces disposed at both distal ends of the bearing cover;
wherein the bearing block comprises counter clamping surfaces opposite the clamping surfaces and disposed at both ends of the bearing block;

wherein the counter clamping surfaces are arranged to be stepped relative to an outer surface and form a lower closure in an area of the bearing cover;

wherein the bearing block in the area of the arrangement of the bearing cover comprises a recess in which the bearing cover is arranged, the recess being delimited by side walls for the arrangement of the bearing cover;

wherein the bearing cover comprises vertically running deformation elements with a longitudinal extension, by means of which the bearing cover can be guided on the bearing block;

wherein the vertically running deformation elements are deformed by the bearing block; and wherein said vertically running deformation elements are made from a softer material than the bearing block or have cavities configured to be pushed at least partly together during plastic deformation or both so that the vertically running deformation elements have a greater degree of plastic deformability than the bearing block.

2. The bearing arrangement as claimed in claim 1, wherein the deformation elements are designed in the form of webs and/or grooves.

3. The bearing arrangement as claimed in claim 1, wherein said side walls comprise additional deformation elements which have a smaller cross-section than the deformation elements of the bearing cover, as viewed respectively in the same direction.

4. The bearing arrangement as claimed in claim 3, wherein the additional deformation elements of the bearing block are designed to be complementary to the deformation elements of the bearing cover.

5. The bearing arrangement as claimed in claim 1, wherein the deformation elements of the bearing cover as viewed in the direction of the longitudinal extension are designed to be at least partly tapering or to be bevelled.

6. The bearing arrangement as claimed in claim 1, wherein the deformation elements of the bearing cover as viewed in direction of the longitudinal extension have an at least approximately triangular or trapezoidal cross-section.

7. The bearing arrangement as claimed in claim 1, wherein the bearing cover comprises vertical bearing surfaces with which it bears on the bearing block, and wherein for each vertical bearing surface at least two deformation elements are arranged.

8. The bearing arrangement as claimed in claim 1, wherein the bearing cover and the bearing block each have horizontal flat surfaces, on which the bearing cover lies on the bearing block, and wherein on said flat surfaces at least one positioning element is arranged.

* * * * *